July 6, 1937.  C. L. CHURCHILL  2,085,954
EXHIBITOR
Filed Aug. 13, 1935   3 Sheets-Sheet 3
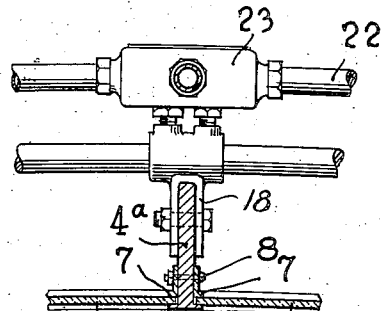
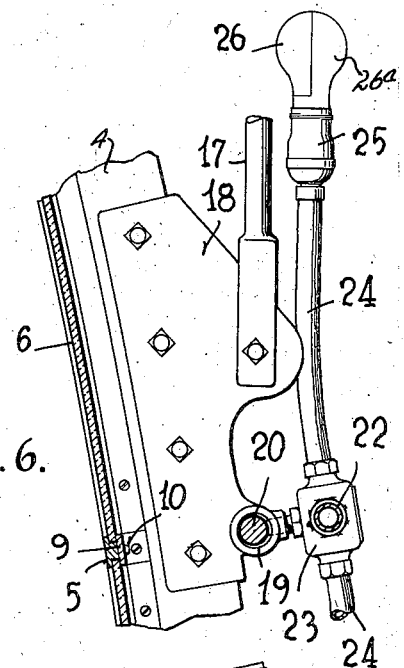
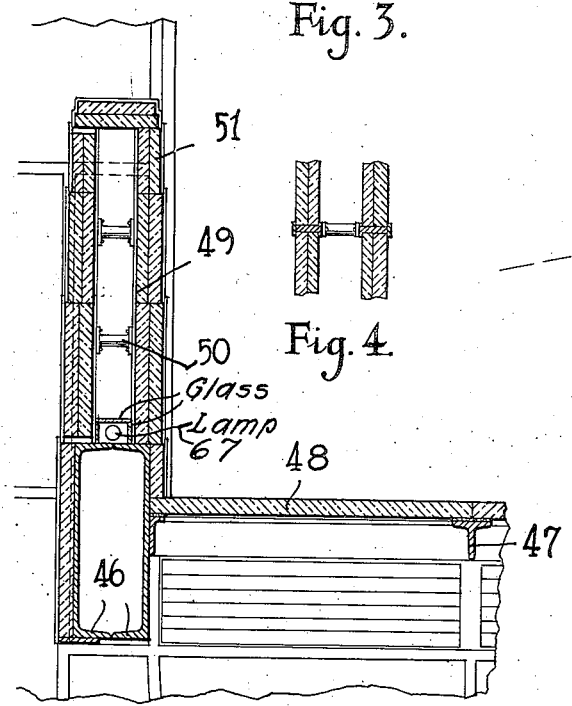
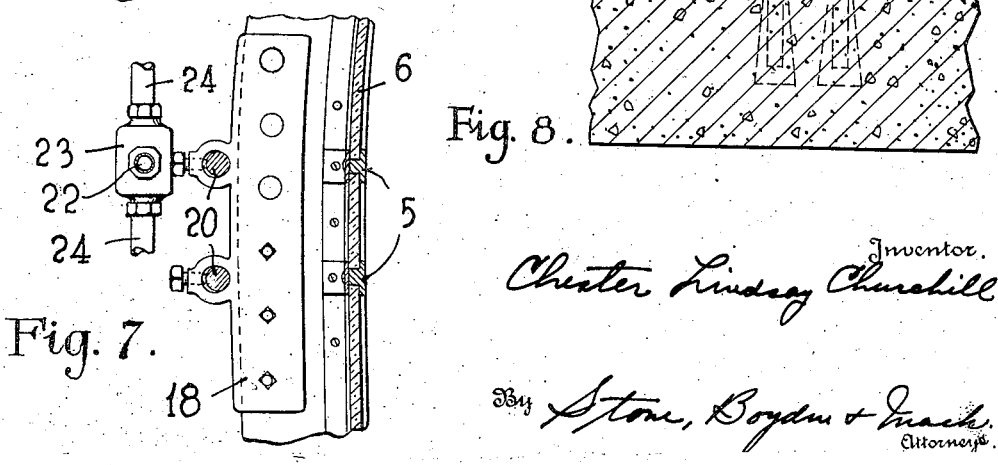

Patented July 6, 1937

2,085,954

UNITED STATES PATENT OFFICE 2,085,954

EXHIBITOR

Chester L. Churchill, Boston, Mass.

Application August 13, 1935, Serial No. 36,028

14 Claims. (Cl. 35—46)

This invention relates in general to exhibitors. More particularly it relates to a novel geographical representation of the earth as a sphere.

It is a general object of this invention to provide a geographical representation of the earth's surface so constructed and arranged that all portions thereof will be visible from the interior and at the same time each portion will occupy its substantially correct relative position with respect to the other portions. This result is accomplished by providing a globe, the walls of which are decorated to represent the earth's surface and providing means whereby these walls may be inspected from the interior of the globe, thus making it possible to view the entire surface of the globe without moving the globe with respect to the observer and at the same time provide a map which is of proper scale with respect to the areas represented.

A further object of the invention consists in the provision of translucent panels constituting the wall of the globe and providing exteriorly of the globe means for illuminating the panels in order that an attractive and novel lighting effect may be obtained.

Still another object of the invention resides in the provision of means for entering the interior of the globe in order that the map may be inspected from the interior thus making possible a view of all points on the map from a single vantage point.

Still further, the invention contemplates the provision of a framework for supporting the panels constituting the wall of the globe, the framework being made up of members representing uniformly spaced divisions of the earth's parallels of latitude and meridians of longitude.

In the drawings:

Fig. 3 is a transverse sectional view through one of the glazing bars showing an outlet box for lights and tie rods;

Fig. 4 is a sectional view through the vertical metal members supporting the rail of the bridge;

Fig. 5 is a transverse sectional view of one rail and a part of the floor of the bridge, showing the louvers which are in the side wall and beneath the level of the bridge floor for admitting fresh air to the interior of the globe;

Fig. 6 is a vertical sectional view through one of the glazing bars showing the means for supporting the glazing bars and the mounting of the lights;

Fig. 7 is a sectional view through the glazing bars at the equator portion, showing the position of the bars with respect to two tie rods and the conduit for the light wiring; and Fig. 8 is a section through the base of the globe showing the means for supporting the lower portion thereof upon the floor.

Figure 1:
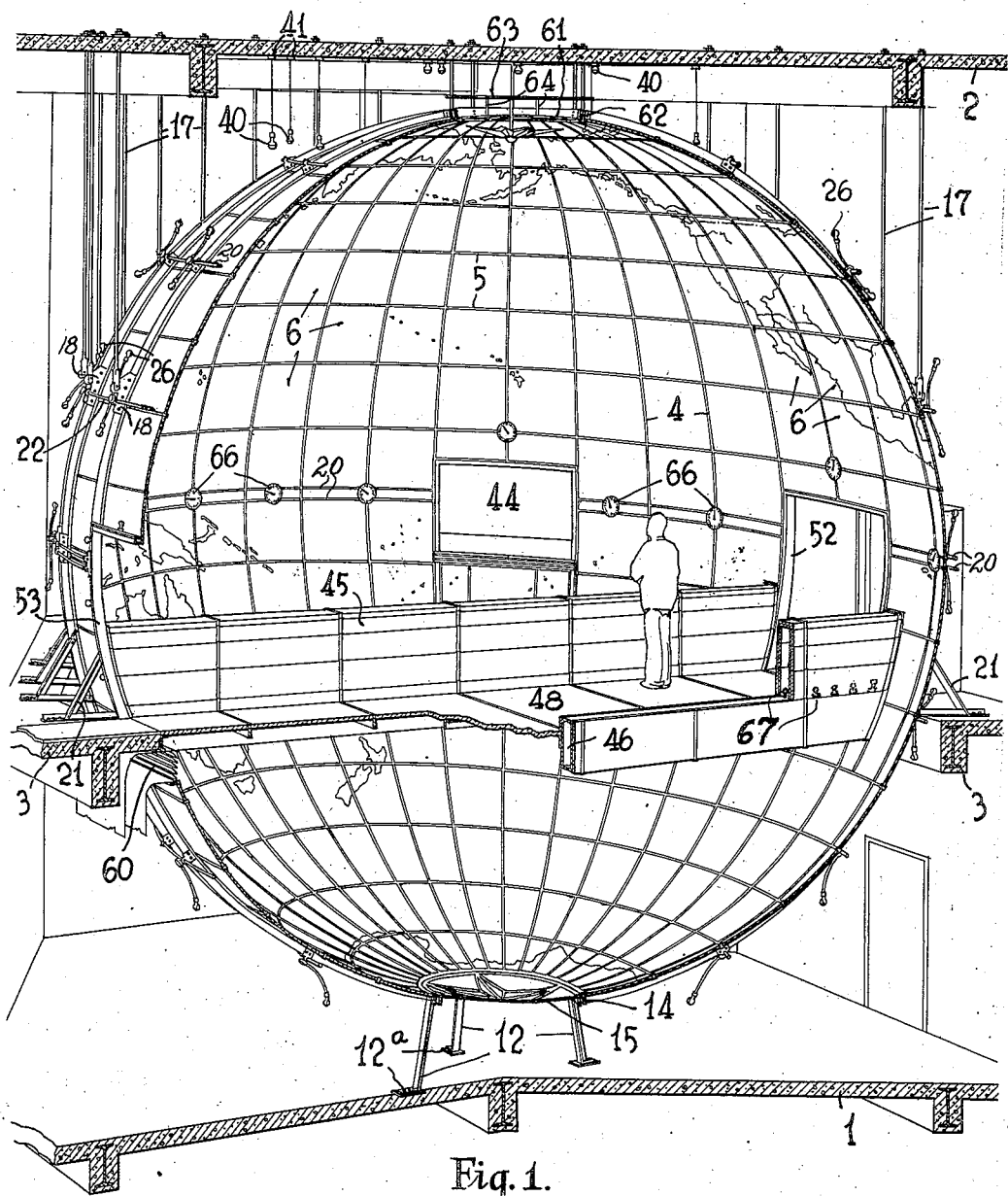
Fig. 1 is a vertical sectional view of a globe with portions broken away to illustrate the bridge therethrough providing access to the interior of the globe.

With more particular reference to the drawings, the apparatus in general comprises a room having a floor 1, a ceiling 2 and a auxiliary floor or shelf 3 located between the floor and the ceiling. The globe mounted in this room comprises a set of generally upright arcuate glazing bars 4 which are arcs of great circles and are spaced at uniform angular distances around the globe in the general position of the meridians of longitude. In the embodiment of the invention herein shown, these meridian glazing bars are spaced at intervals of 10° of circular measure. Cooperating with and secured to each of the glazing bars 4 at each intersection and at right angles thereto are a plurality of transverse glazing bars 5. These transverse glazing bars are each of circular form and are spaced from one another at equal distances of circular measure and each serves to represent parallels of the earth's latitude.

As may be clearly seen in the detailed sectional views shown in Figures 3 and 6, the glazing bars 4 and 5 are substantially T-shaped in cross section. The bars 4, which are of considerably more substantial construction than the bars 5, are provided with a central rib 4ª extending outwardly as an enlargement of the stem of the T thereof to provide means for supporting the globe. This will be clear by comparing the length of the rib 4ª in Figure 3 with the shorter stem of the bar 5 in Figure 6 and Figure 7 which is not much thicker than the glass panels 6. The glazing bars 4 and 5 together form a spherical sash work which is adapted to receive a plurality of panels 6 of translucent material, these panels are held in position in the sash work by means of securing strips 7. A pair of securing strips 7 is provided for each pair of panels along the vertical glazing bars 4 and is bolted into position by means of transverse bolts 8 extending through the body portion 4ª of the glazing bar. Each pair of panels 6 is seated in the glazing bar 5 and retained in position by means of a backing strip 9 secured to the outer surface of the glazing bar by means of tap screws 10. These details are shown in Figures 3 and 6.

Figure 2:
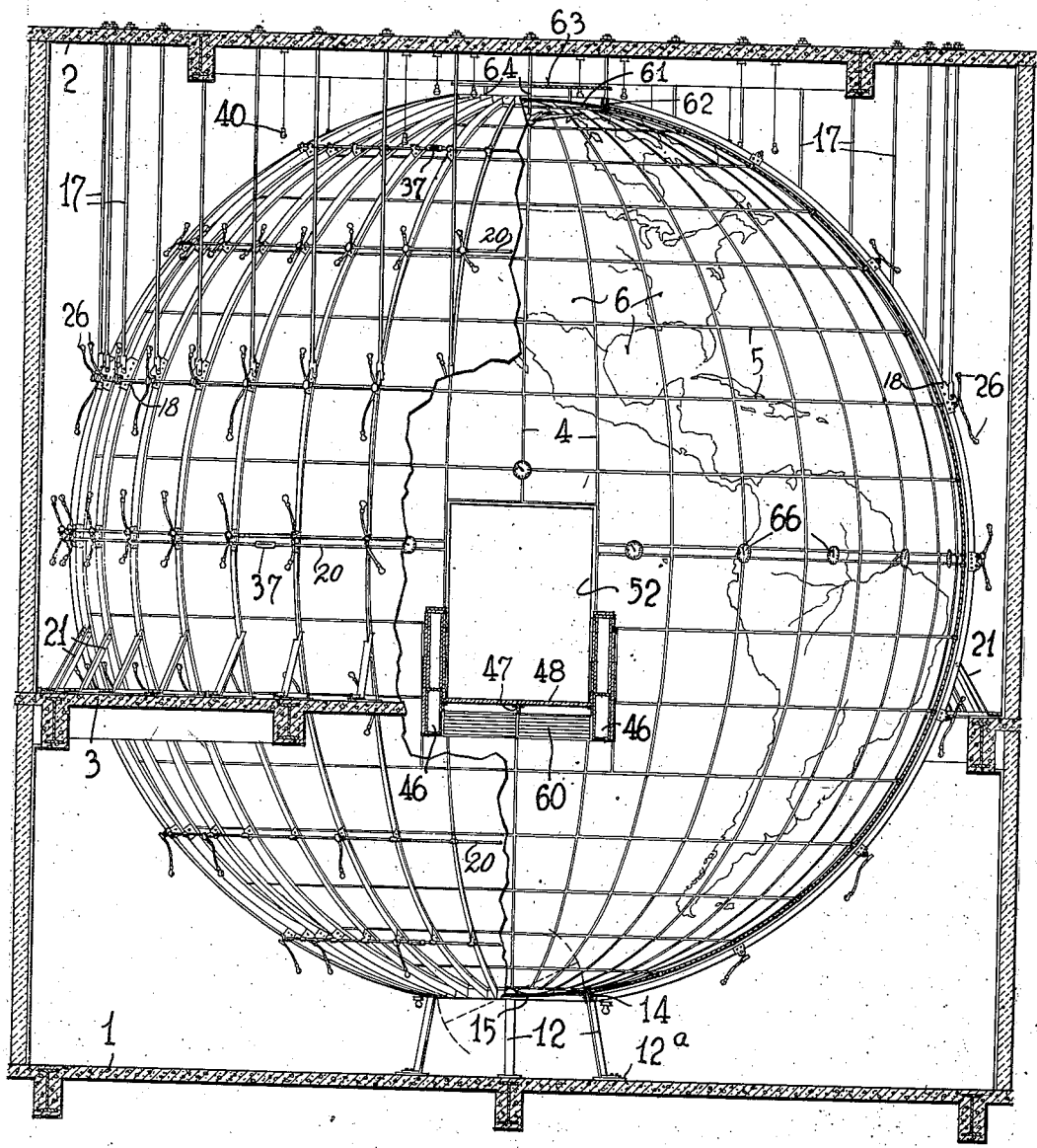
Fig. 2 is a side elevation of the globe as illustrated in Fig. 1 with parts broken away, the bridge being shown in section.

The sphere is supported in the room by three distinct and separate means of support. The lower portion of the globe is supported on three legs 12 having feet 12a bolted to the floor 1 by suitable expansion bolts 13. These legs 12 are secured to a metallic frame element 14 having the shape of a ring extending in a horizontal plane and to which the lower ends of the glazing bars 4 are secured. Mounted within the ring 14 is a door 15 which serves normally to close the aperture in the lower portion of the globe and which is mounted to tilt on a horizontal axis as indicated in Figure 2 formed by the ring 14.

The upper portion of the globe is in general supported by means of a plurality of vertically disposed hanging rods 17 which have their upper ends bolted into the ceiling 2 and have their lower ends pivotally secured to a fitting 18 bolted to the web of each of the vertical glazing bars 4 (Fig. 3 and Fig. 6).

The upper portion of the lower half of the globe is supported by means of an annular series of brackets 21 secured to the vertical glazing bars 4 and resting upon the auxiliary floor 3.

The fittings 18 are each provided with a transverse aperture 19. Circular tie rods 20 pass through all of the apertures 19 in the fittings 18 and serve to hold the framework together. Also to this fitting 18 is fastened hanging rods 17 for support. Where fittings 18 do not receive hanging rods 17, as at the equator and south of the equator, the shape of fitting 18 is slightly different because of the lack of necessity to provide for the hanging rod 17. In all cases the tie rod 20 passes through the aperture 19 in the fitting 18. Three tie rods encircle the globe at intervals above the equator, three tie rods also encircle the globe below the equator, and two tie rods encircle the globe at the equator (Fig. 8). All tie rods are provided with turnbuckles 37 for adjustment. Mounted on the fitting 18, extending completely around the globe, are conduit lines 22 opening at convenient intervals into condulet fittings 23, which have connections upwardly and downwardly. Conduit lines 22 extend around and encircle the globe in back of all tie rods, except the lower tie rod at the equator line. From each of the condulet fittings 23 extend short flexible conduits 24, each carrying at its outer end a socket 25 into which is screwed an electric light bulb 26. These are shown conventionally in Figure 6 as having a light projecting portion and an opaque backing used for reflecting purposes indicated at 26a. It will be apparent that due to the flexible conduits 24 the light bulbs 26 may be adjusted at any suitable position with respect to the exterior surface of the globe.

As shown in Figs. 3 and 6 the conduit 22 is positioned laterally in front of the tie rod 20 and thus hides the turnbuckle which is an essential element of the tie rod assembly. In Fig. 7, the conduit 22 is located opposite the upper tie rod of the pair at the equator, so that the lower tie rod is not obscured but the turnbuckle 37 may be seen as at 37 in Fig. 2.

In order to provide additional lighting for the upper portion of the globe surface a plurality of lights 40 may be suspended from suitable boxes 41 on the ceiling 2. All of the lights may be connected together so that they may be simultaneously lighted. A window 44 is provided in the side of the globe approximately at the equator thereof in order that a person standing on the auxiliary floor 3 may through the window 44 view the entire interior of the globe. Means for viewing the globe from the interior thereof comprise a bridge or walkway generally designated by the numeral 45 constructed with a pair of beams 46 at either side thereof and a central beam 47. These beams extend from the auxiliary floor 3 transversely through the globe and serve to support a floor 48 for the bridge preferably formed of transparent material such as structural glass in order that persons standing on the bridge may have an unobstructed view of the lower portions of the globe.

The bridge has a pair of railings supported by vertically disposed members 49 separated by means of spacing members 50 and serving to support an outer covering of transparent material such as heavy plate glass 51 forming a solid and continuous railing on either side of the bridge floor. It will be noted that the bridge is so constructed that the floor thereof lies in substantially the same horizontally plane as the auxiliary floor 3 and is slightly lower than the axial central portion of the globe in order that a person standing upon the bridge 45 will have his eyes at substantially the equator of the globe.

Doorways 52 and 53 through the wall of the globe are provided at each end of the bridge 45 in order to facilitate access to the bridge.

The panels 6 which constitute the wall of the globe are preferably made of glass and have their surfaces decorated with suitable coloring material in order to depict the proper relation of the geographical features of the earth presented inwardly, that is centrally of the globe. These glass panes 6 after they have been colored are preferably fused to render the coloring permanent and are then mounted in the globe framework by means of the strips 7 and 10 as described above. The panels are preferably constructed in such a manner that they are translucent but not transparent, serving to diffuse the light from the exterior of the sphere and provide an illumination of substantially uniform intensity all over the inner surface of the globe. In the assembly illustrated, in accordance with the detail of Figure 6 it is intended that the light bulbs 26 throw their light onto the surface of the walls, floor and ceiling of the encircling room, which are light in color, and reflect the light through the glass.

Mounted beneath the doorways 52 and 53 in the globe and just beneath the level of the bridge floor are a plurality of louvers 60 which serve to allow fresh air to be admitted to the interior of the globe. This air will rise by convection to the upper portion of the globe and may be withdrawn from the globe through an aperture 61 at the upper axial end of the globe. This aperture 61 is provided by means of a ring 62 similar in construction to the ring 14 described at the lower end of the globe and forms an anchor for the ends of the vertical glazing bars. The aperture 61 may be hidden from sight from within the globe by means of a cover plate 63 spaced slightly above the ring 62 by means of a plurality of supporting studs 64 thus screening the opening but not interfering with the passage of air from the interior of the globe.

It will be apparent that it is particularly desirable in order that the various countries of the world may be completely illustrated, that the apertures 52, 53 and 44 occur in areas of the globe surface covered by ocean in order that the land surface of the earth may be completely illustrated on the panels.

A plurality of electrically controlled clocks 66 may be provided at suitable intervals around the equatorial region of the globe in order to illustrate the correct time in various parts of the world.

It will be apparent from the foregoing that the apparatus of the present invention provides a novel means for displaying the earth's surface and provides a map of the world in which almost all points on the earth's surface are visible from a single vantage point. The map thus resulting may be prepared and colored and may be drawn to scale.

While the specific embodiment of the invention herein disclosed is illustrated in connection with a map of the world and is particularly adapted for such use, it will be apparent that the generic spirit of the invention as defined in the appended claims is not limited to the particular geographical representation which may be depicted upon the walls of the globe and that the fundamental principles of the invention may be utilized in other fields.

What I claim is:

1. An exhibitor comprising a globe having its interior accessible for view from the inside and having a framework and panels mounted in said framework and carrying geographical representations thereon facing inwardly, said panels being penetrable by light from the exterior, a housing enclosing said globe and having a ceiling, side walls and floor beneath said globe and all spaced from it, supporting means connected to said globe and holding it in spaced relation to said ceiling and floor, and means within said room and exterior of said globe to substantially envelop the exterior of said globe with light, thus to illuminate said geographical representations for viewing from within said globe, the map details being so arranged as to present the proper relation of the geographical features when viewed from the interior of the exhibitor.

2. An exhibitor device comprising a globe having its interior accessible for view from the inside, said globe being formed of a framework representing parallels of latitude and meridians of longitude of the earth, and translucent panels mounted in said framework, the map being so arranged as to present the proper relation of the geographical features when viewed from the interior.

3. An exhibitor device comprising a globe having its interior accessible for view from the inside, said globe being formed of a framework representing parallels of latitude and meridians of longitude of the earth, and translucent panels mounted in said framework, the map being so arranged as to present the proper relation of the geographical features when viewed from the interior by light transmitted from the outside through said translucent panels.

4. An exhibitor device comprising a globe having translucent walls, said walls having geographical representations thereon arranged so as to present the proper relation of the geographical features when viewed from the interior, illuminating means external of said globe including a plurality of lighting units arranged about said globe in spaced relation to each other and to the surface of the globe to provide for distribution of light to the interior thus transmitted from said units, and means providing access to the interior of the globe whereby said illuminated walls may be viewed from the interior of the globe.

5. Exhibition apparatus comprising a globe having translucent walls with geographical representations thereon so arranged as to present the proper relation of geographical features when viewed from the interior of the globe, means for illuminating the exterior of said walls, and a substantially transparent walkway capable of supporting persons extending into said globe and providing access to the interior of said globe whereby said geographical representations may be viewed.

6. Exhibition apparatus comprising a globe having a framework and a plurality of translucent panels mounted in said framework carrying geographical representations so arranged as to present the proper relation of the geographical features when viewed from the interior of said globe, and means for viewing the interior of said globe including an opening in the wall of the globe through which persons on the exterior may view the interior.

7. Exhibition apparatus comprising a room having a main floor and a ceiling and an auxiliary floor between said main floor and ceiling, a globe having its interior accessible for view from the inside and mounted in said room and supported jointly by said main floor and said auxiliary floor and dependingly from said ceiling and having geographical representations thereon so arranged as to present the proper relation of the geographical features when viewed from the interior of said globe.

8. Exhibition apparatus comprising a room having a main floor and a ceiling and an auxiliary floor between said main floor and ceiling, a globe mounted in said room and supported jointly by said main floor and said auxiliary floor and dependingly from said ceiling and having geographical representations thereon so arranged as to present the proper relation of the geographical features when viewed from the interior of said globe, a transverse bridge extending through said globe as a continuation of said auxiliary floor, supporting means between the upper half of said globe and said ceiling and second supporting means between said auxiliary floor and the upper part of the lower half of said globe.

9. Exhibition apparatus comprising a room having a main floor and a ceiling and an auxiliary floor between said main floor and ceiling, a globe mounted in said room and supported jointly by said main floor and said auxiliary floor and dependingly from said ceiling and having geographical representations thereon so arranged as to present the proper relation of the geographical features when viewed from the interior of said globe, a transverse bridge extending through said globe and communicating with said auxiliary floor and supported thereby, supporting means between the upper half of said globe and said ceiling and second supporting means between said auxiliary floor and the upper part of the lower half of said globe.

10. An exhibitor device comprising a globe having its interior accessible for view from the inside, said globe being formed of a framework, and translucent panels mounted in said framework, said panels together comprising a map of the surface areas of the earth and the map being so arranged as to present the proper relation of the geographical features when viewed from the interior.

11. An exhibitor device comprising a globular framework, a plurality of translucent panels carried by said framework, said panels together forming a geographical representation of the earth's surface so arranged as to present the proper relation of the geographical features when viewed from the interior of said device, means mounted outside of said globe for illuminating said panels including a plurality of lighting units arranged about said globular framework and panels in spaced relation to each other and to the surface of the panels to provide for distribution of light transmitted from the units to the interior, and means for access into said globe whereby said panels may be viewed from the interior of said globe.

12. An exhibitor device comprising a globular framework, a plurality of translucent panels carried by said framework, said panels together forming a geographical representation of the earth's surface so arranged as to present the proper relation of the geographical features when viewed from the interior of said device, means mounted outside of said globe for illuminating said panels including a plurality of lighting units arranged about said globular framework and panels in spaced relation to each other and to the surface of the panels to provide for distribution of light transmitted from the units to the interior, and a bridge extending into said globe and on which persons may stand to view the geographical features from the interior of the globe.

13. An exhibitor comprising a roomlike structure having its interior wall surfaces accessible for view from the interior, the walls of said exhibitor having substantially the curvature of a sphere and being formed of an assembly of framework and panels carried thereby, such framework having parts in the position of parallels of latitude and meridians of longitude of the earth's surface, and said panels being mounted on said framework and displaying geographic details to the center of the exhibitor, said panels being substantially translucent to the passage of light from the exterior, the geographic details being so arranged as to present the proper relation of the features thereof when viewed from the interior of the exhibitor.

14. An exhibitor comprising a roomlike structure having its interior wall surfaces accessible for view from the interior, the walls of said exhibitor having substantially the curvature of a sphere and being formed of an assembly of framework and panels carried thereby, such framework having parts in the position of parallels of latitude and meridians of longitude of the earth's surface, and said panels being mounted on said framework and displaying geographic details to the center of the exhibitor, said panels being substantially translucent to the passage of light from the exterior, the geographic details being so arranged as to present the proper relation of the features thereof when viewed from the interior of the exhibitor, and a substantially transparent walkway extending into the interior of said exhibitor from a doorway in the wall thereof, substantially all points within said exhibitor and said panels being within sight of each other across the interior of the exhibitor.

CHESTER L. CHURCHILL.